US011065728B2

(12) United States Patent
Chheda et al.

(10) Patent No.: US 11,065,728 B2
(45) Date of Patent: Jul. 20, 2021

(54) BASE POD ASSEMBLY FIXTURE AND METHOD

(71) Applicant: Amazon Technologies, Inc., Seattle, WA (US)

(72) Inventors: Kunal Chheda, Medford, MA (US); Jamil Afza, Boston, MA (US); Erik Jon Kempf, Clarkston, MI (US); Aaron Kirkland Tyack, Imlay City, MI (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/957,475

(22) Filed: Apr. 19, 2018

(65) Prior Publication Data

US 2019/0321925 A1 Oct. 24, 2019

(51) Int. Cl.
*B23P 19/04* (2006.01)
*B23P 19/10* (2006.01)
*A47B 43/04* (2006.01)

(52) U.S. Cl.
CPC .............. *B23P 19/04* (2013.01); *A47B 43/04* (2013.01); *B23P 19/10* (2013.01)

(58) Field of Classification Search
CPC .............. Y10T 29/53961; B25H 1/007; B05B 13/0285; A47B 43/04; B25B 11/02; B66F 7/22; B66F 7/28; B66F 9/00; B66F 9/06; B66F 11/00; B66F 11/04; B23P 19/04; B23P 19/10
USPC .............................. 29/281.1; 269/17, 71, 71.1
See application file for complete search history.

(56) References Cited

U.S. PATENT DOCUMENTS

| 3,631,578 | A | * | 1/1972 | Shangler | A47B 47/021 |
| | | | | | 269/8 |
| 3,674,166 | A | * | 7/1972 | Dunbar | B60P 1/16 |
| | | | | | 414/469 |
| 4,963,070 | A | * | 10/1990 | Detrick | B66F 9/06 |
| | | | | | 280/763.1 |
| 5,380,140 | A | * | 1/1995 | Johnson | B60P 1/16 |
| | | | | | 414/421 |
| 5,816,568 | A | * | 10/1998 | Fox | B25B 5/14 |
| | | | | | 269/60 |
| 6,581,920 | B1 | * | 6/2003 | Smith | B25H 1/0007 |
| | | | | | 254/134 |
| 7,448,606 | B1 | * | 11/2008 | Johnson | B05B 13/0285 |
| | | | | | 269/16 |
| 2010/0281666 | A1 | * | 11/2010 | Tseng | B25B 11/02 |
| | | | | | 29/281.1 |

(Continued)

FOREIGN PATENT DOCUMENTS

IT UA20162936 A1 10/2017

OTHER PUBLICATIONS

SCM Group; "CPC WS 1600"; www.youtube.com/watch?v=8BSI6bbgu8q; Jun. 2016; 2 pages.

(Continued)

*Primary Examiner* — Orlando E Aviles
*Assistant Examiner* — Robert F Neibaur
(74) *Attorney, Agent, or Firm* — BakerHostetler

(57) ABSTRACT

A fixture for assembling a pod includes arms that are carried on a stretcher, such that a collapsed fabric bin array can be elongated on the fixture to aid in the assembly of structural supports of the fabric bin array.

12 Claims, 11 Drawing Sheets

(56) References Cited

U.S. PATENT DOCUMENTS

2017/0055699 A1 3/2017 Neuwirth et al.
2017/0238700 A1 8/2017 Davis et al.

OTHER PUBLICATIONS

International Patent Application No. PCT/US2019/028318; Int'; Search Report and the Written Opinion; dated Aug. 12, 2019; 19 pages.
International Patent Application No. PCT/US2019/028318; Int'l Preliminary Report on Patentability; dated Oct. 29, 2020; 11 pages.

* cited by examiner

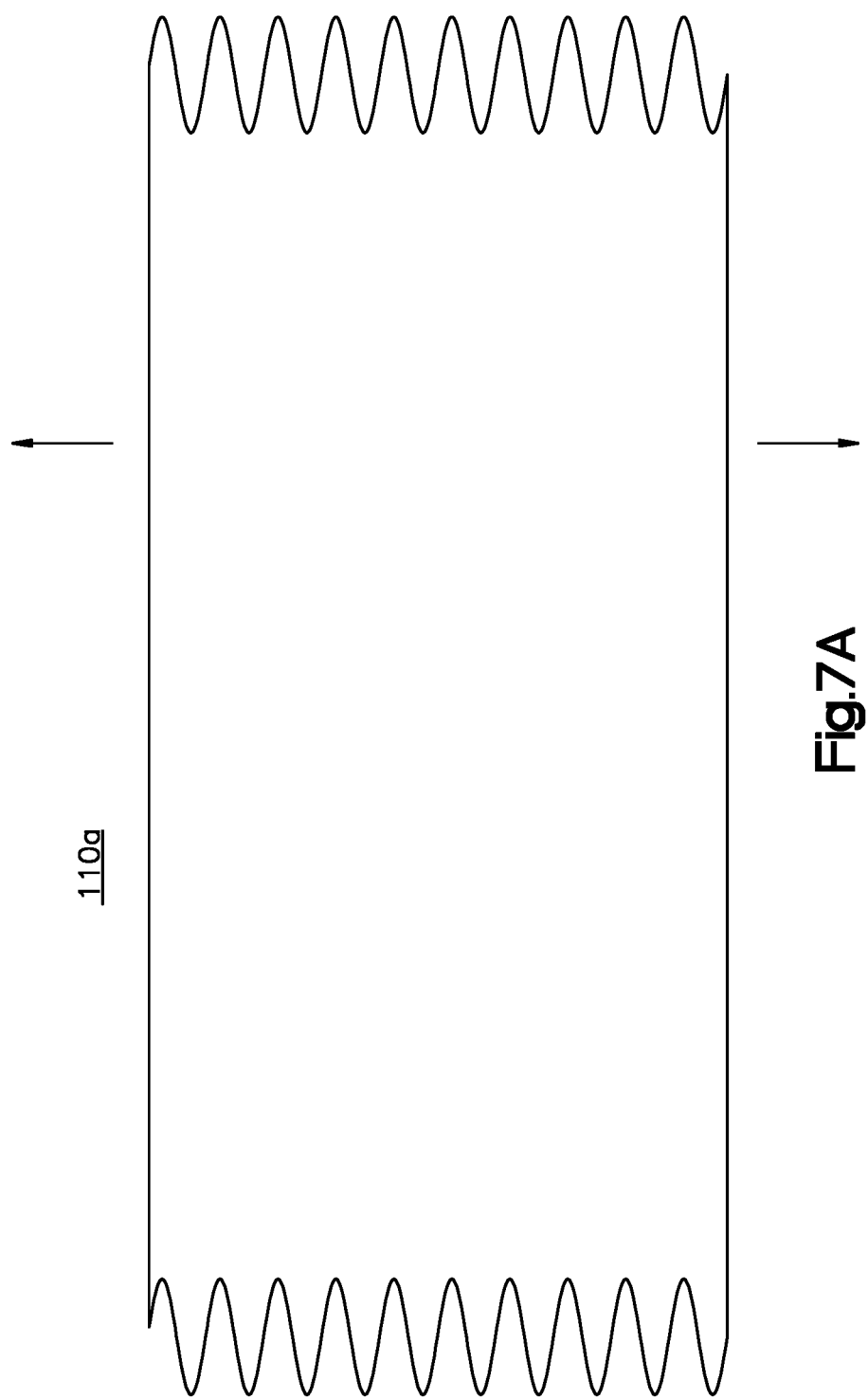

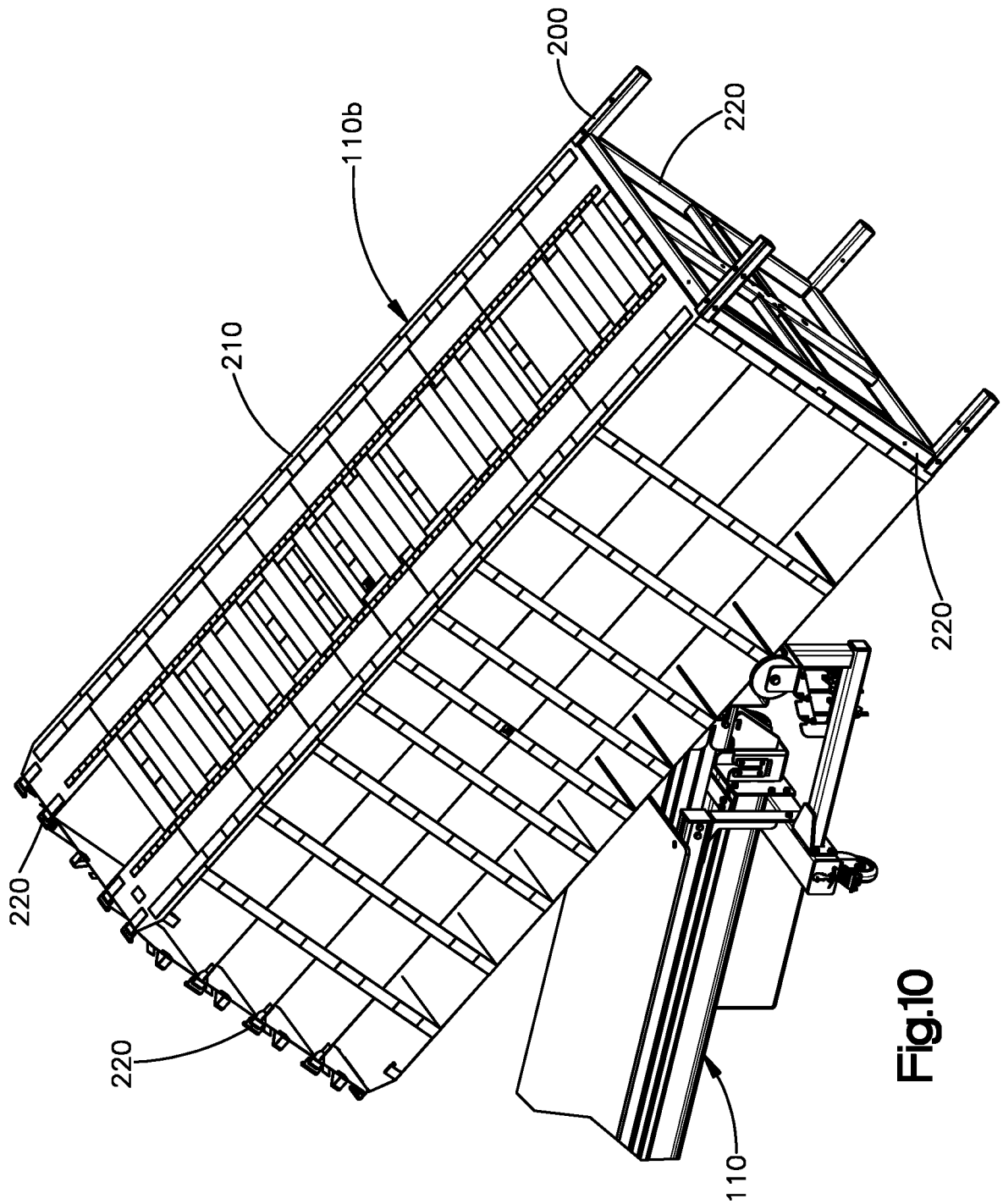

BASE POD ASSEMBLY FIXTURE AND METHOD

BACKGROUND

The invention relates to machinery and processes for assembling a shelving or bin unit, and more particularly a fixture and method for forming a pod unit from metal supports and a collapsed array of fabric bins and structural supports.

A staple of a modern warehouse, such as an order fulfillment center, is automated movement of products on a large scale. One type of system uses short mobile drive units that carry four sided bin units, referred to as pods, throughout the facility based on information in fiducial markers on the floor and on the underside of the pod. The mobile drive units move beneath a pod, read the information from the fiducial marker on the underside of the pod, and lift the pod to carry it to another location within the facility for processing products, such as stowing items in the individual bins on the pod or picking items from the bins as part of the process of fulfilling a customer's order.

Typically, an assembled pod has four sides or faces, each of which includes several shelf-like bins that are identified by a 2D or 3D bar codes. A flexible band extends across the face to retain items in the bin until removal is desired. The floor of each bin has a rigid or semi-rigid insert. Conventional pod have several configurations, each having height and width dimensions that are chosen according to the parameters of the fulfillment center.

A conventional pod has a welded structural base frame, including four legs (one at each corner) and horizontal braces between the legs to form a square. Typically at least the legs are formed from square steel tubing. Four structural steel angles form uprights that are inserted into the open ends of the leg tubing and attached with rivets. Structural top brackets connects the uprights together to form a cuboid frame.

Shelf-like bins of the pod are formed by a single-piece fabric assembly and rigid or semi-rigid floors. The fabric and floor assembly, referred to as a fabric bin array, includes triangular cut-outs or loops at each corner. The metal uprights extend vertically through the loops. The uppermost part of the fabric bin array includes beam-like supports that are sewn into the fabric bin array and that are supported by the top braces. Fabric tabs on the perimeter of the top of the fabric bin array are attached around the top braces by a hook-and-loop fastener on the tabs.

During traditional assembly, the fabric bin array, including all the bins and floors, arrive at an assembly station in a collapsed state. Uprights are manually inserted through each loop and inserted into the legs of the base frame in a time consuming and ergonomically unfriendly process.

BRIEF DESCRIPTION OF THE DRAWINGS

FIG. 7A is a perspective, schematic view of a fabric bin array in a collapsed configuration, before it is extended by application of the fixture;

FIG. 10 is a view of the fabric bin array and assembly system shown in FIG. 7, with the fabric bin array part-way unloaded from the assembly system.

DETAILED DESCRIPTION OF ILLUSTRATIVE EMBODIMENTS

Figure 1:
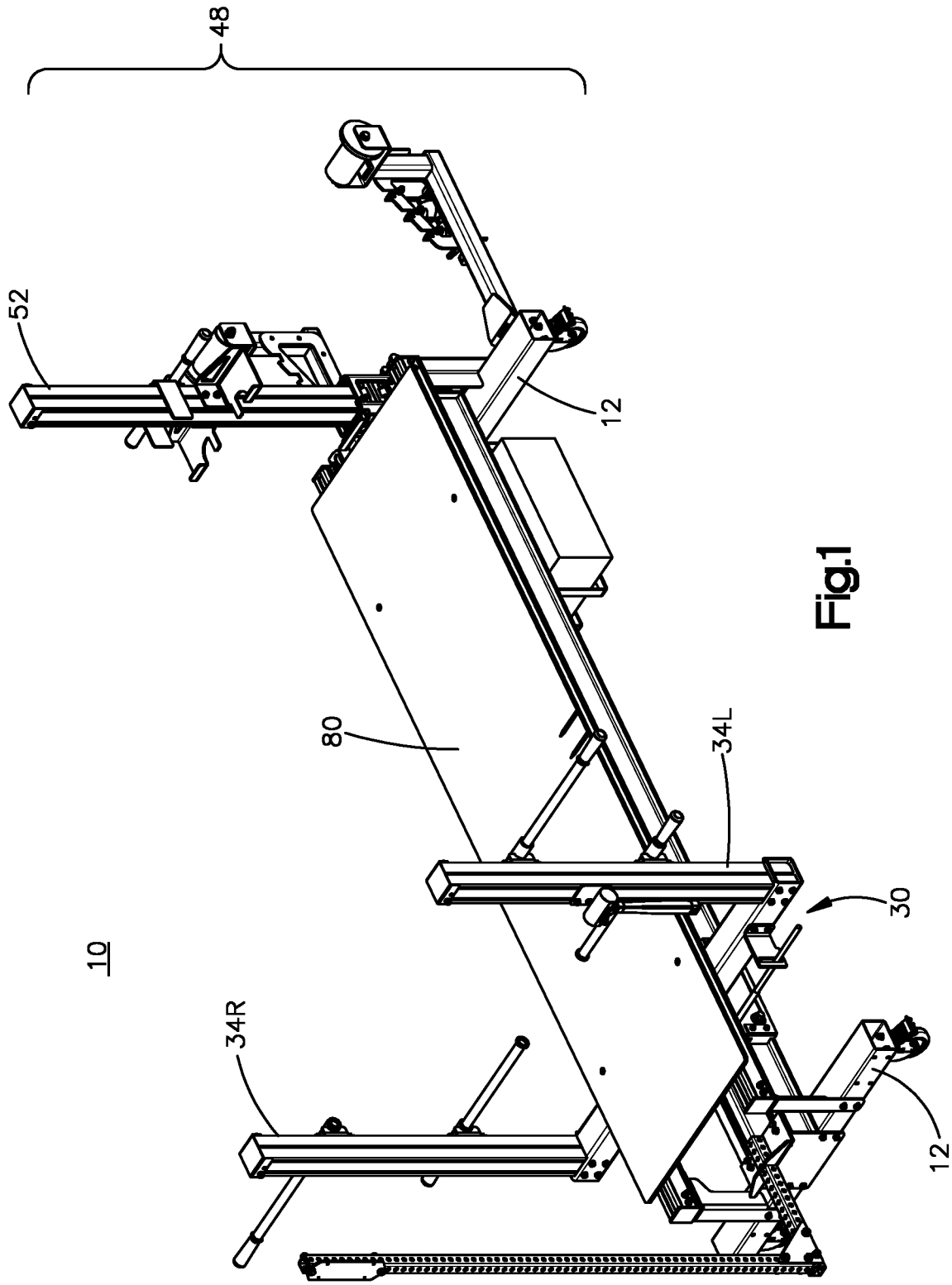
FIG. 1 is a perspective view of an assembly system for assembling a pod unit illustrating aspects of the present invention.
Figure 2:
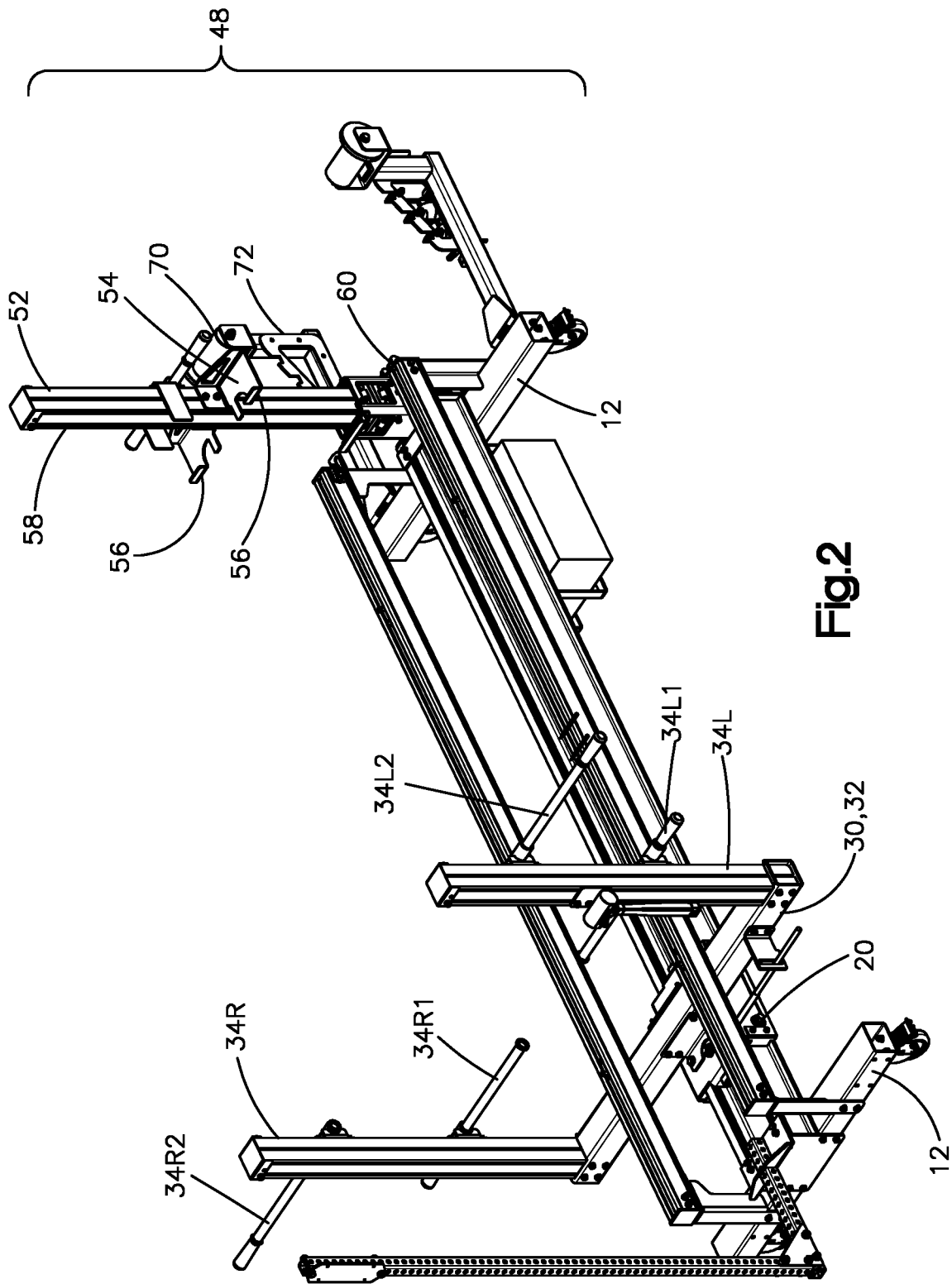
FIG. 2 is a view of the system of FIG. 1 with the deck removed to illustrate the carriage and rail.
Figure 3:
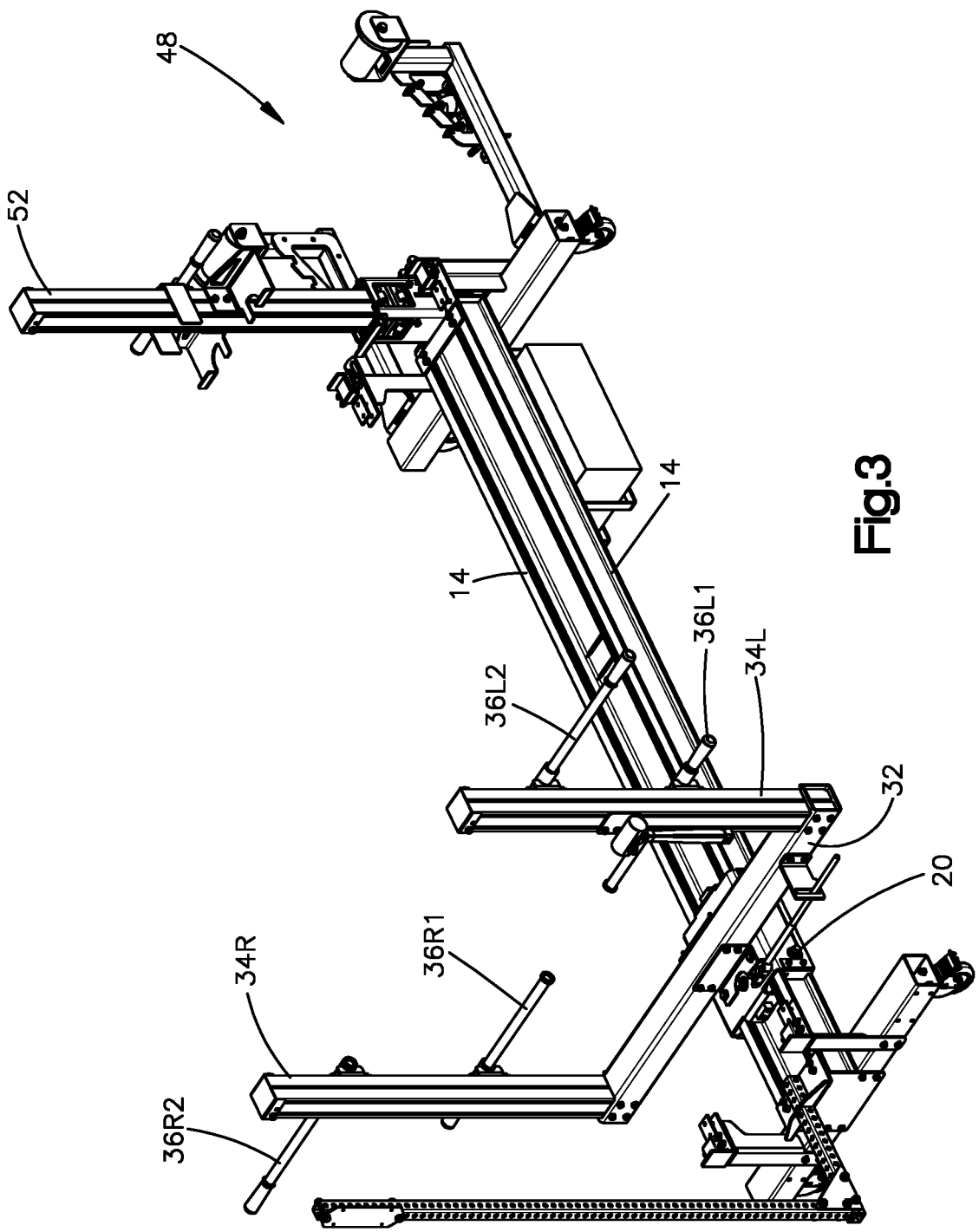
FIG. 3 is a view of the system of FIG. 1 with the deck and deck support structure removed to illustrate the carriage and rail.
Figure 4:
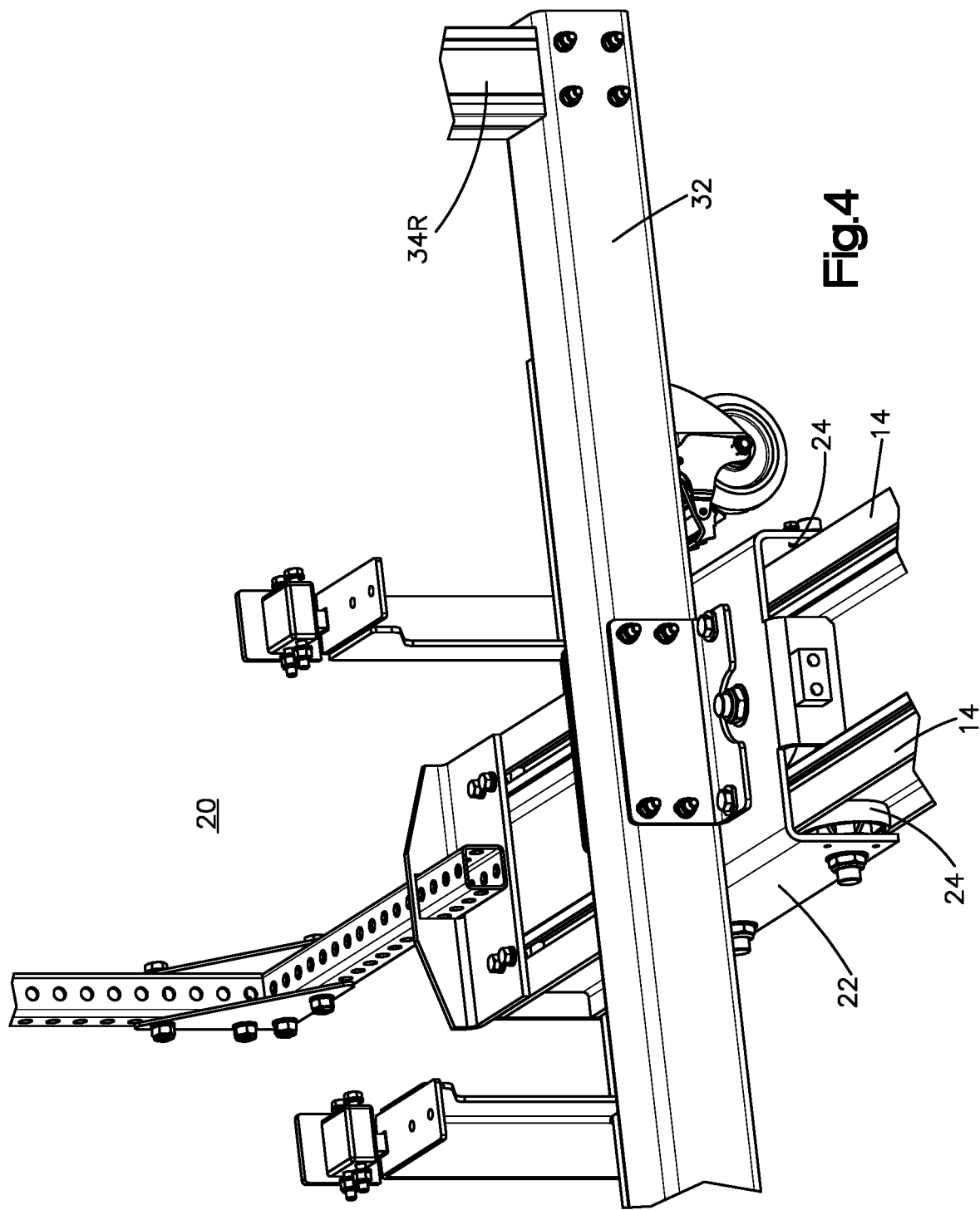
FIG. 4 is an enlarged perspective view of a portion of the assembly of FIG. 1, illustrating the carriage.
Figure 5:
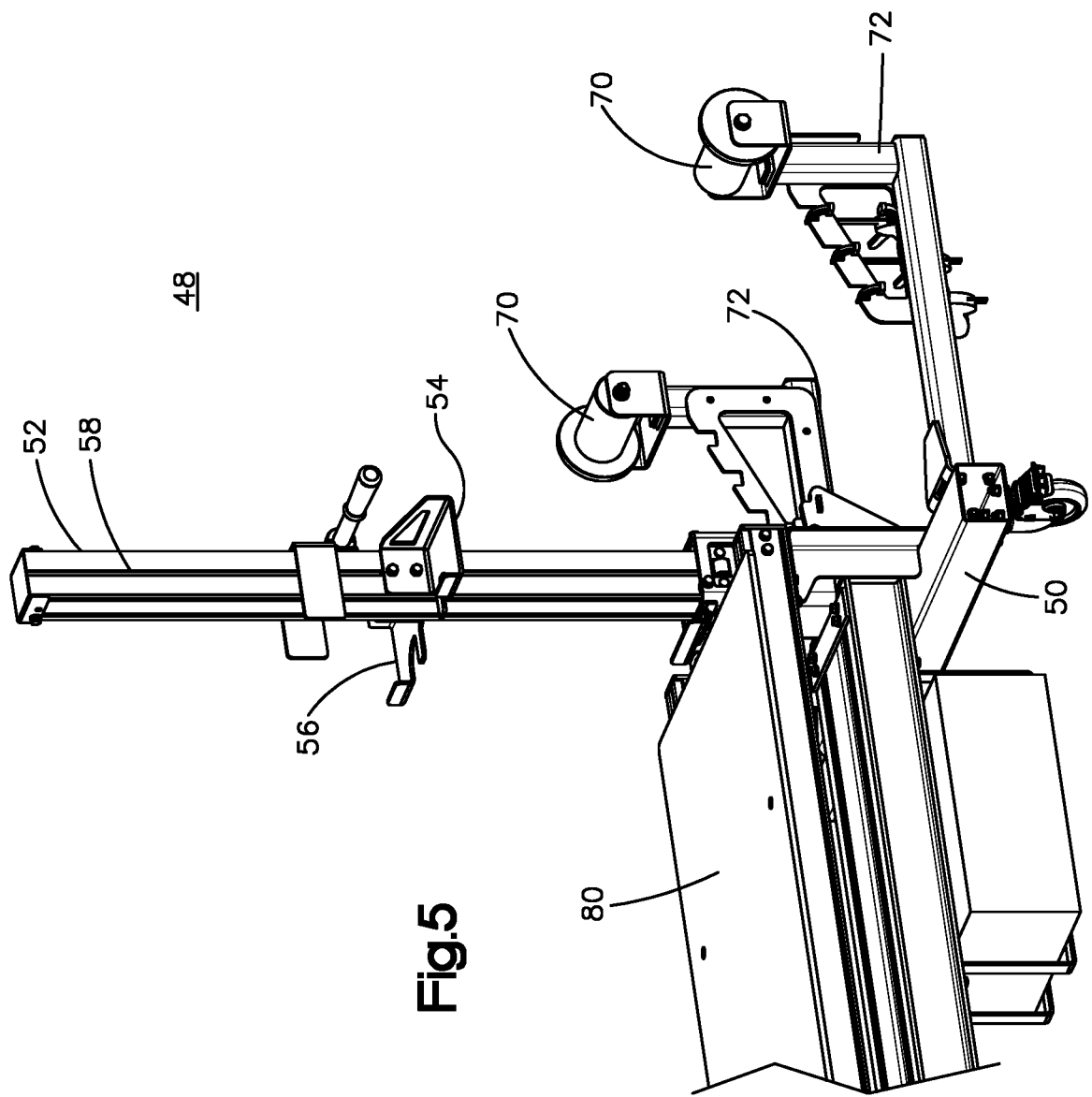
FIG. 5 is an enlarged perspective view of a portion of the assembly of FIG. 1, illustrating the base end.
Figure 6:
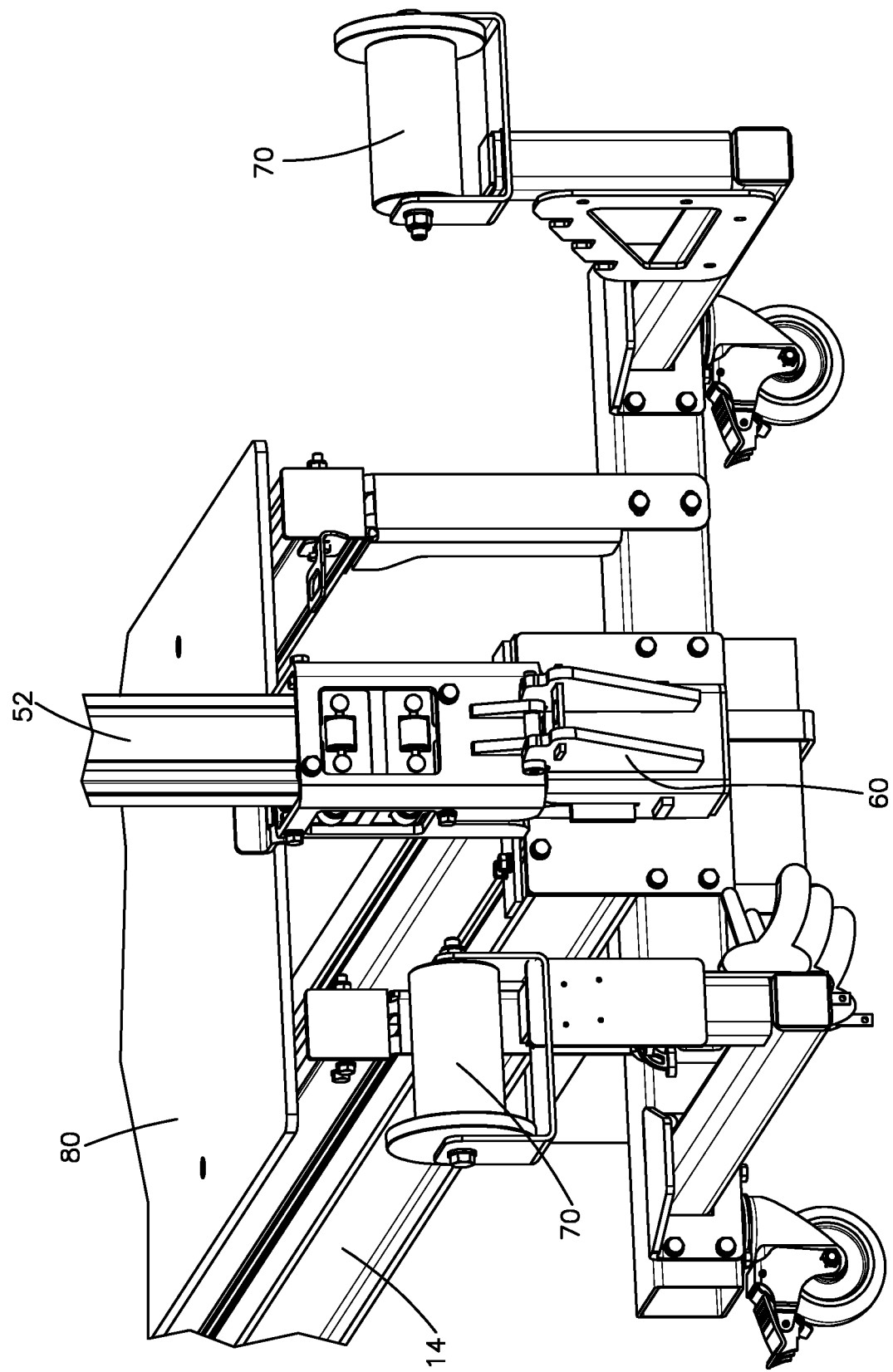
FIG. 6 is another enlarged perspective view of the base end shown in FIG. 5.

A fixture and method of assembling the steel and fabric components are described herein to illustrate aspects of the invention. An assembly system for assembling a pod unit includes the fixture, the structural components of the frame, the fabric bin array, and (optionally) stretch bands.

Referring first to the product of the assembly process, a pod unit includes a fabric bin array 110 that has a cuboid shape with openings or bins 120 on all four sides, as shown in FIGS. 7 through 10. Each bin 120 opens outwardly and includes a rigid or semi-rigid floor 130, which may be formed of a paperboard corrugate. The fabric bin array may include vertical fabric walls to separate bins and identifying information on a face of the bin. Fabric bin array 110 can define a bottom portion 112 and a top portion 114.

Figure 8:
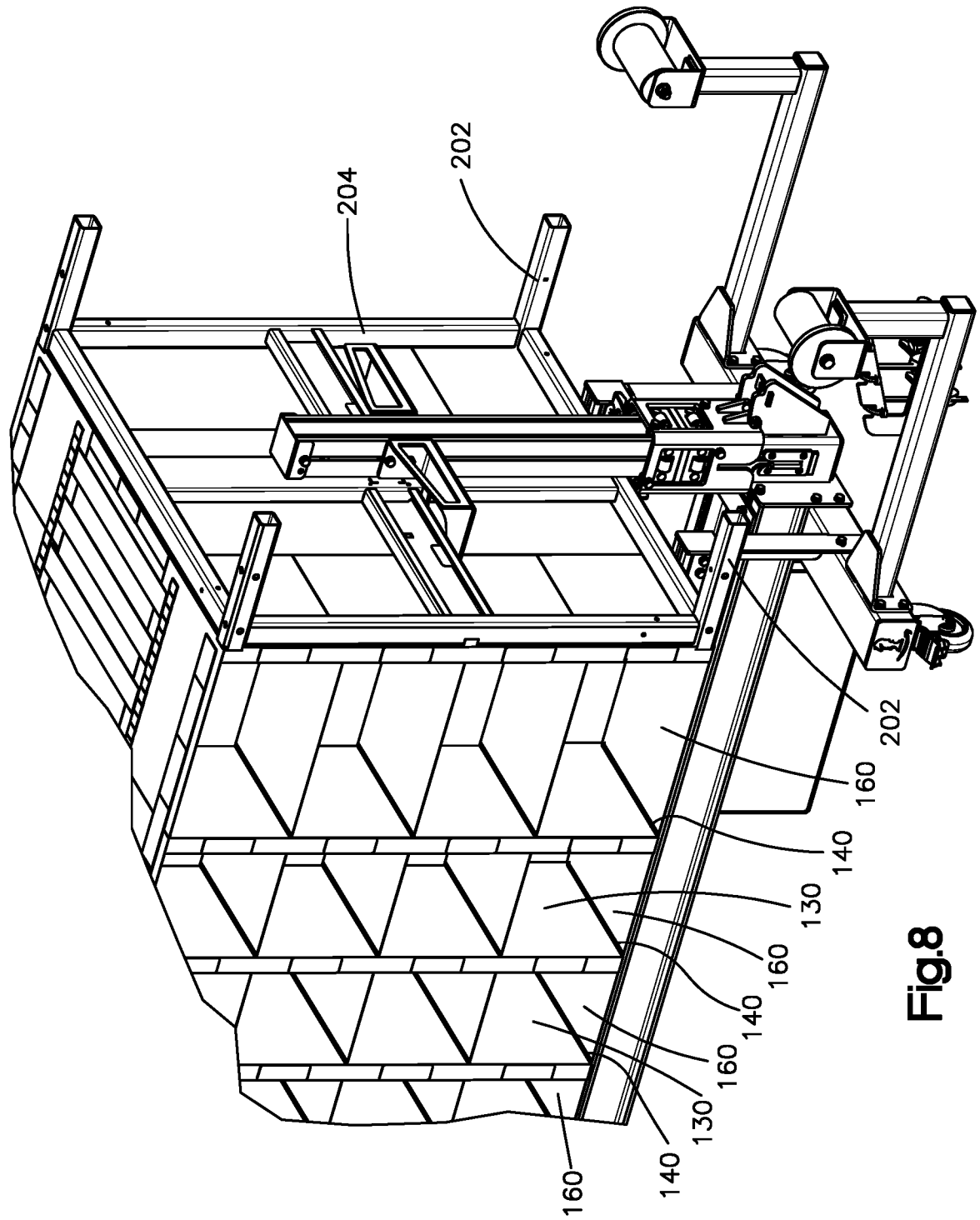
FIG. 8 is an enlarged perspective view of a bottom portion of the fabric bin array and base end of the assembly system of FIG. 1.

The fabric and floor 130 has a triangular cutout that forms a loop 140 at each bin floor, as explained more fully below, and as shown in FIG. 8. Top portion 114 includes sewn-in supports and top tabs 150. Stretch bands 160 extend laterally (that is horizontally) across the bins to retain items with bins 120.

A welded structural base 200 includes legs 202 and horizontal braces 204 between the corner-legs 202. Uprights 210 in the embodiment in the figures are steel angles that are fit into the top openings of legs 202 and fastened by rivets. Other fasteners, such as screws, bolts, detents, and the like are contemplated. Four top braces 220 span between uprights 210 to form a box-like, cuboid frame or skeleton.

Figure 7B:
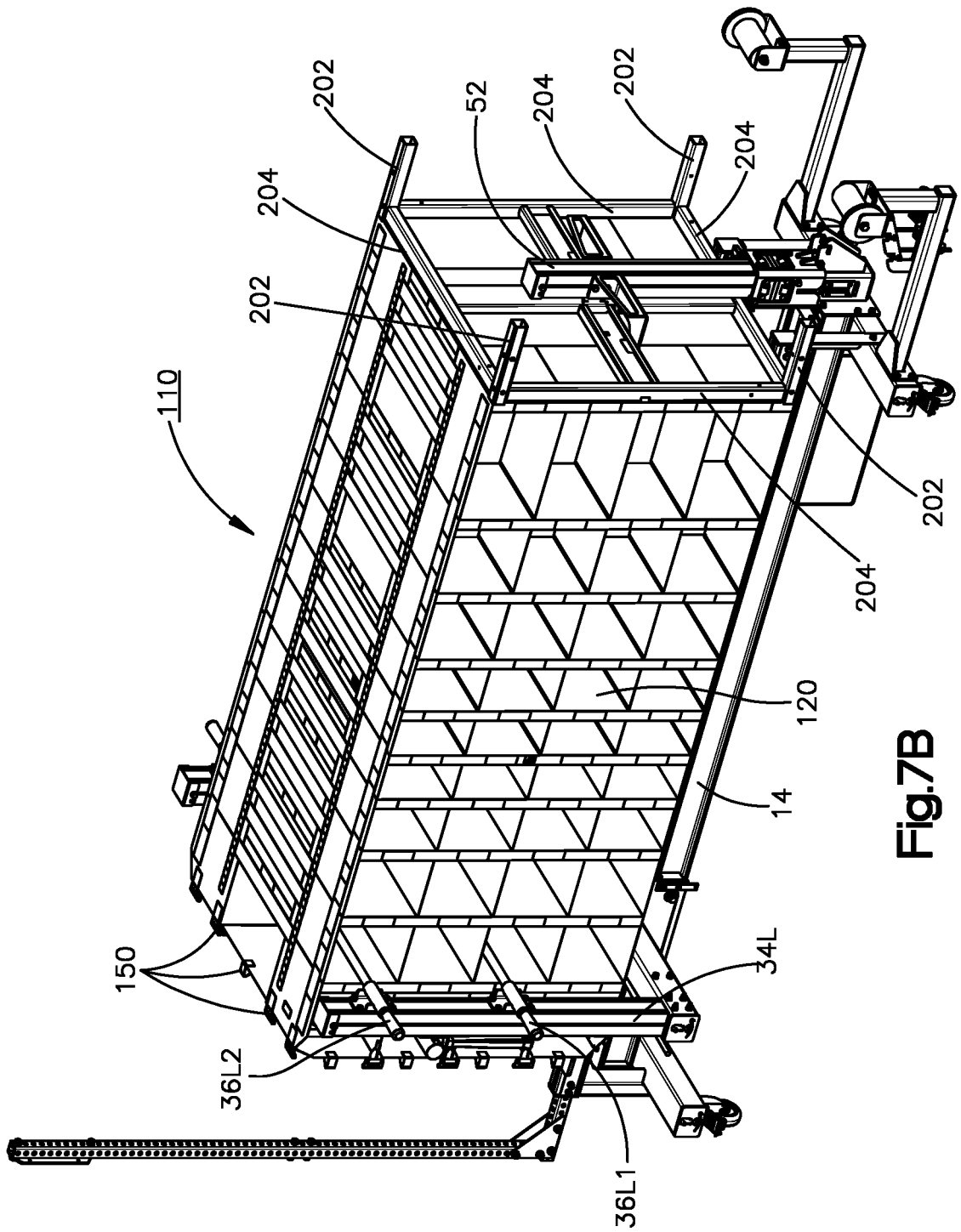
FIG. 7B is a perspective view of the assembly system of FIG. 1 showing a fabric bin array mounted on the assembly system of FIG. 1.

Fabric bin array 110 is fabricated by sewing and shipped in a longitudinally collapsed state, which is identified by reference number 110a. FIG. 7A schematically illustrates the collapsed state of the fabric bin array in a side view showing pleated sides, including arrows illustrating the direction at which fabric bin array 110a is stretched. In this regard, the transverse cross section of compressed bin array 110a has the width and depth of that of the finished fabric bin array 110, except possibly for some accordion-like folding of the fabric. The height of collapsed bin array 110a is significantly less that than of finished, assembled array 110, as the purpose of collapsed state 110a is to diminish the volume for transporting and handling.

A fixture 10 includes a base 12 and a horizontally extending rail or rail system 14. A carriage assembly 20 includes a carriage body 22 and wheels or rollers 24 that are engaged with rail 14 to enable carriage 20 to move longitudinally (that is, along the axis defined by rail 14). In this regard, a pair of rails 14 are longitudinally oriented and provide a surface on which rollers 24 run to carry carriage body. Other configurations, such as slide plates and the like, are contemplated.

Carriage body 22 carries a stretcher assembly 30, which has the purpose of carrying arms that extend or stretch the collapsed fabric bin array 110a to its extended length. Stretcher assembly 30 includes a beam 32 that is affixed to carriage body 22 and is oriented horizontally and transverse to the longitudinal axis (that is, perpendicular to the orientation of rail 14), to define a transverse orientation or direction. A pair of vertical stretcher uprights 34L and 34R extend upwardly from opposing ends of beam 32 such that stretcher assembly 30 forms a U-shape. A deck 80 is located over rail 14 and supported such that deck 80 and its support does not interfere with the longitudinal movement of carriage 20. Uprights 34L and 34R are spaced mutually apart by a dimension that is greater than the width (that is, transverse dimension) of deck 80 such that uprights 34L and 34R are outboard of deck 80 such that carriage 20 and stretcher assembly 30 can translate from the base end to the distal end of fixture 10 around deck 80 (that is, without interference by deck 80).

Top and bottom arms 36L1 and 36L2 extend horizontally and transversely from first upright 34L. Top and bottom arms 36R1 and 36R2 extend horizontally and transversely from second upright 34R. Each arm 36L1, 36L2, 36L3, 36L4 has an extended position in which it is located inwardly toward a longitudinal centerline that is parallel with rail 14 and a retracted position in which the arm is moved outwardly. Each upright 34L and 34R includes vertical tracks such that the elevation position of the arms may be adjusted. Arms 36 are illustrated in the figures are bars (which term is broadly used to include a circular, square, and any other cross sectional shape). The arms shown are bars, which can be of any cross sectional shape, and the term arm is used broadly herein to include other configurations, such as paddles having a vertically oriented, planar surface.

A base end 50 of fixture 10 includes a base support assembly 50, which includes an upright arm, referred to herein as offloading arm 52 that holds a base frame support bracket 54. Support bracket 54 extends transversely and is oriented toward an inboard side to face fabric bin array 110 during assembly. Bracket 54 includes upwardly extending hook-like ears 56 that are configured for retaining braces 204 of the structural base 200, as explained below. Offloading arm 52 includes tracks 58 that enable the vertical position of support bracket 54 to be adjusted, if needed, to enable fixture 10 to receive fabric bin arrays of multiple sizes.

Base support assembly 50 includes a hinge assembly 60 that enables offloading arm 52 to pivot relative to the base 12 at base end 48 from its upright position to a down or open position. Hinge assembly 60 can be any configuration, such as a pivot pin through corresponding holes in offloading arm 52 and base 12. Hinge assembly 60 includes a locking feature such as a locking pin through corresponding holes in offloading arm 52 and base 12, or any other configuration that retains arm 52 in its vertical position.

A pair of rollers 70 are on the outboard side of base end 48 and extend from base 12 by roller support arms 72. Rollers 70 aid in the unloading of the assembled fabric bin array 110, as explained below.

To assembly a pod unit, a structural base 200 (oriented 90 degrees from its upright orientation) is placed on the base end 48 of fixture 10, with the legs 202 toward the outboard end and one of the braces 204 engaged with the base support bracket 54 and retained by ear 56. An opposing one of the legs 202 rests on or is positioned near deck 80. A collapsed fabric bin array 110a is placed with its bottom end 112 in contact with braces 204 of base 200. Preferably, left and right sides of bin array 110a is clamped with the corresponding (vertically oriented) brace to anchor bin array 110a to base 200.

Stretcher assembly 30 is moved to near the base end 12 with arms 36 in their retracted position. With arms 36 positioned near an upper portion of the collapsed bin array 110a, arms 36 are moved from their retracted position to their extended position to extend into bin array 110a near the underside of the floor 130' of the uppermost one of the bins 120. With arms 36 extended and located into the bin 120, carriage 20 is moved distally (that is, in a longitudinal direction opposite to or away from fixture base end 48) to elongate the bin array from its collapsed position 110a to an elongated position 110b. In the embodiment of the figures, carriage 20 is moved by hand (such as by a person pushing on stretcher 30), and automated means, such as any type of linear actuator, are contemplated.

In the elongated position 110b, loops 140 at each corners of the fabric bin array are longitudinally aligned, as shown in FIG. 8. Thus, uprights 210 are inserted horizontally from the top end of the fabric bin array 110b through the entire length of the bin array through loops 140. After uprights 210 are inserted into each loop 140, the ends of the uprights are inserted into the open ends of base legs 202. Preferably, uprights 210 are riveted to legs 202 while the fabric bin array is horizontal on fixture 10. Top braces 220 are installed between the distal ends of uprights 210 such that the steel uprights 210, top braces 220, and base braces 204 form a box-like frame.

Upon the full extension of elongated bin array 110b (that is, upon stretcher 30 reaching its distal most point, which is limited by the structure of the fabric bin array), a pair of beam-like supports (not shown in the figures) that are sewn-into the topmost portion of the fabric bin array 110 are inserted over the top braces 220. Tabs 150 on the perimeter of the top portion 114 of the fabric bin array 110 are attached to the top braces 220. Tabs 150 preferably include hook and loop portions for fastening over the braces 220.

Fabric bin array 110a preferably arrives at the fixture 10 with elastic bands 160 sewn or otherwise attached to only a pair of opposing sides of the collapsed fabric bin array 110a. Preferably, the sides having bands 160 are oriented on the bottom (that is, contacting or facing deck 80) and top when bin array 110a is oriented on the fixture 10. Bands 160 are shown schematically in FIG. 8 before stretching. Thus, an additional step may include grasping lower ends of the bands on the bottom-facing side of the elongated bin array 110b (or if supplied loose, attaching the bands by a hook and loop fastener), stretching the bands vertically over the side face of the array 110b, and attaching the top ends of the bands to the uppermost side of the bin array 110b, such as by a hook and loop fastener.

Figure 9:
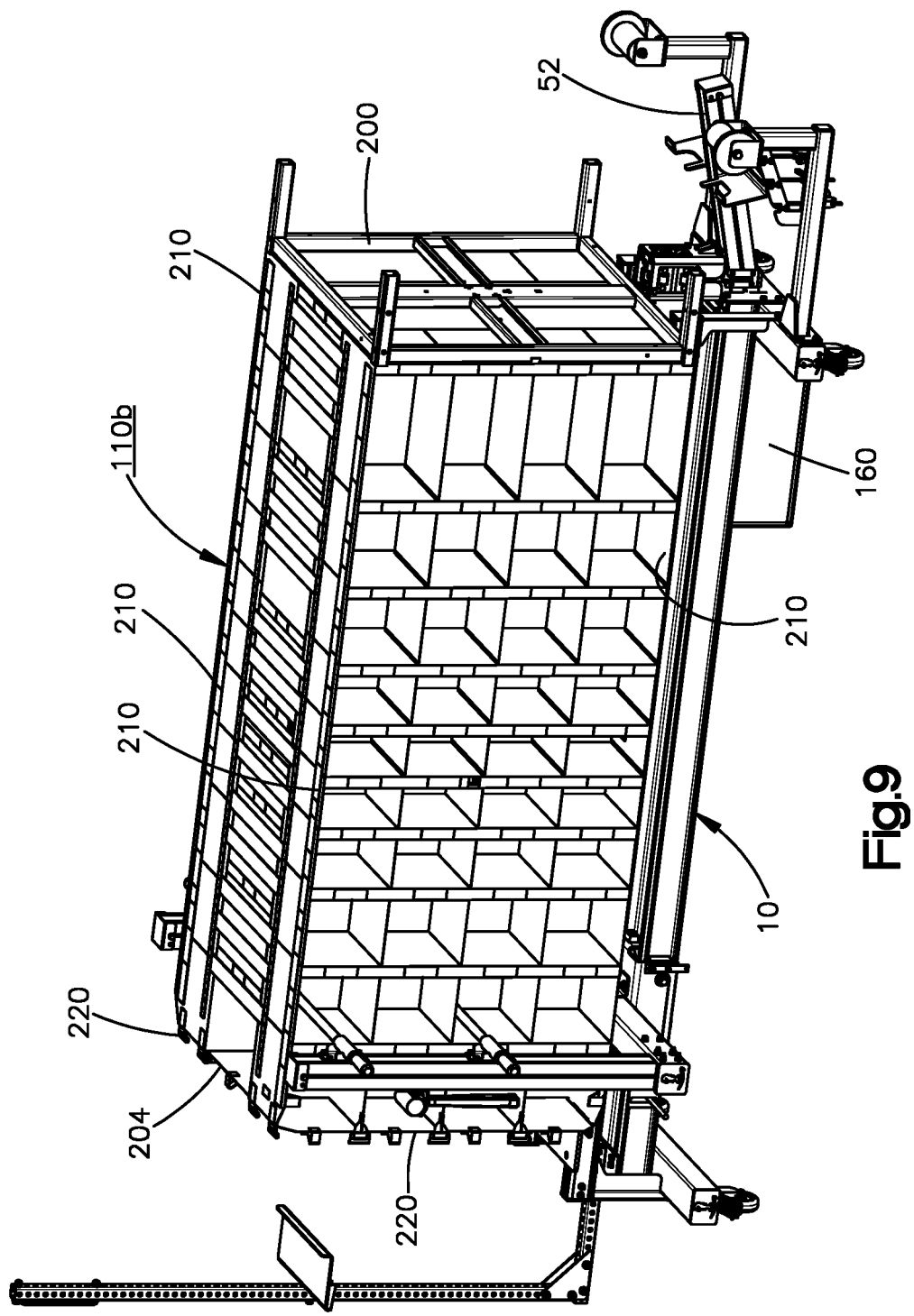
FIG. 9 is a view of the fabric bin array and assembly system shown in FIG. 7 with the upright of the base end in the unlocked and down position.

Upon complete assembly of the fabric bin array 110 on fixture 10, or completion of a sufficient number of steps of the assembly process, the fabric bin array 110 may be unloaded from fixture 10 by unlocking and moving upright arm 52 to its down position, which is shown in FIG. 9. Bin array 110 can be moved or translated longitudinally over base end 48 such that rollers 70 support legs 202 and then uprights 210. Bin array 110 can then be rotated or pivoted to an upright position. In this regard, FIG. 10 illustrates to rotating movement, with bin array 110 partially pivoted toward its upright position. When fully upright, such that bin array 110 is supported on the ground by legs 202, the bin array 110 may be transported and is ready to be placed into use.

The present invention has been described with respect to a particular structures and functions of merely one embodiment. But the present invention is not limited to any of the structure or function described herein unless the structure or function is expressly set out in the claims. Rather, the present invention is intended to encompass easily understood structures and functions. Thus the present invention is intended to be given the fully scope of the claims.

What is claimed is:

1. An assembly system for assembling a pod unit, the assembly system comprising:
    a fixture including:
        a base end;
        a rail extending longitudinally from the base end;
        a stretcher assembly including a pair of opposing upper and lower extendible arms, each one of the extendible arms having an extended position and a retracted position; and
        a carriage adapted for carrying the stretcher assembly longitudinally on the rail; and
    a bin array having a collapsed position and a longitudinally elongated position, the bin array including loops at corners thereof, and
    a base frame and uprights extending from the base frame, wherein the pair of opposing upper and lower extendible arms, in their extended position, are configured to engage openings in the bin array in the collapsed position such that movement of the stretcher assembly extends the bin array to the elongated position, thereby aligning the loops of the elongated bin array to receive the uprights therethrough.

2. The assembly system of claim 1, wherein the base end includes a base support bracket supported on an offloading arm that is moveable between an upright, operational position and a down, open position, and wherein the fixture is configured to enable an assembled structure comprising the bin array, the base frame, and the uprights to be moved off the fixture while the offloading arm is in the open position and the extendible arms are in the retracted position.

3. The assembly system of claim 2, wherein the fixture further includes rollers outboard of the offloading arm, the rollers being configured to support the assembled structure while the offloading arm is in the open position.

4. The assembly system of claim 2, wherein the base support bracket includes ears that engage the base frame.

5. The assembly system of claim 1, further comprising top braces removably connected to the uprights, wherein the uprights are removably connected to the base frame, the bin array includes top tabs, and the top tabs are configured to fasten to the top braces while the bin array is in the elongated position.

6. The assembly system of claim 5, wherein the bin array further includes fixed bands extending transversely across opposing first and second sides of the bin array, and the assembly system further comprises stretch bands that are adapted to be stretched across third and fourth sides of the bin array and secured to the first and second sides.

7. A method for assembling a pod unit, using the assembly system of claim 1, the method comprising: positioning the base frame of the pod unit on a base support bracket of the fixture; positioning the bin array in the collapsed position relative to the base frame; inserting the extendible arms of the stretcher assembly into openings of the bin array; moving the stretcher assembly away from the base frame to elongate the bin array; inserting the uprights into the corner opening loops of the elongated bin array; and coupling top braces to the uprights to secure the elongated bin array to the top braces.

8. The method of claim 7, wherein positioning the base frame of the pod unit on the base support bracket of the fixture includes securing the base frame to the base support bracket.

9. The method of claim 7, wherein positioning the collapsed bin array relative to the base frame includes clamping a lower portion of the collapsed bin array to the base frame.

10. The method of claim 7, wherein inserting the uprights into the corner opening loops of the elongated bin array includes coupling lower ends of the uprights to the base frame.

11. The method of claim 10, further comprising lowering an offloading arm that supports the base support bracket and sliding an assembled structure comprising the base frame, bin array, the uprights, and the top braces on rollers toward the base end of the fixture over the lowered offloading support arm.

12. The method of claim 7, further comprising attaching transverse bands across opposing first and second sides of the bin array after inserting the uprights into the corner opening loops of the elongated bin array.

\* \* \* \* \*